United States Patent [19]
Dalessio, Jr. et al.

[11] Patent Number: 5,687,833
[45] Date of Patent: Nov. 18, 1997

[54] SUPPORT ROLLER AND WORKPIECE CONVEYING SYSTEM

[76] Inventors: Frederick P. Dalessio, Jr., 127 Morgan Rd., Aston, Pa. 19014; Frank Simkins, 100 Schoolhouse La., Brook Haven, Pa. 19015

[21] Appl. No.: 450,681

[22] Filed: May 25, 1995

[51] Int. Cl.⁶ .................................................. B65G 13/02
[52] U.S. Cl. .................................. 198/786; 193/35.55
[58] Field of Search ........................... 198/699.1, 721, 198/780, 782, 786, 757.01; 193/37, 35 MD, 35.55; 492/29, 35, 42, 43; 269/289.14 R

[56] References Cited

U.S. PATENT DOCUMENTS

| | | | |
|---|---|---|---|
| 2,393,471 | 1/1946 | Johnson | 271/2.3 |
| 3,087,599 | 4/1963 | Nelson | 198/780 |
| 3,921,789 | 11/1975 | Goldinger et al. | 198/782 |
| 4,345,678 | 8/1982 | Garnett | 193/37 |
| 4,352,447 | 10/1982 | Bonaddio et al. | 225/2 |
| 4,553,931 | 11/1985 | Wachi et al. | 193/37 |

*Primary Examiner*—Kenneth Noland
*Attorney, Agent, or Firm*—Eugene E. Renz, Jr.

[57] ABSTRACT

A support and conveying roller and system utilizing the same for supporting and conveying a workpiece such that the workpiece is maintained in a substantially horizontal plane even though the workpiece includes members projecting therefrom toward the support roller. The support and conveying roller includes an axle with a mandrel mounted thereon such that the mandrel is capable of rotational movement about the axle and lateral movement along the axle. There is a brush helicaly wound about the mandrel and attached only at the ends thereof such that individual coils of the brush are capable of movement relative to adjacent coils of that same brush. The brush has a fiber density sufficient to generally support the workpiece in the substantially horizontal working plane while simultaneously allowing the portions of the workpiece extending angularly from the bottom surface of the workpiece to infiltrate between the fibers. The support and conveying rollers are mounted on a frame at substantially the same elevation. A hydraulic lift system may be incorporated into the frame to allow the support and conveyor rollers to be simultaneously raised or lowered.

27 Claims, 8 Drawing Sheets

SUPPORT ROLLER AND WORKPIECE CONVEYING SYSTEM

1. FIELD OF THE INVENTION

The present invention relates generally to support and conveying apparatus, and more particularly, to conveying rollers which support a workpiece while a labor function is performed thereon.

2. BRIEF DESCRIPTION OF THE PRIOR ART

A variety of conveyor rollers are known in the prior art, some of which employ brush bristles projecting therefrom to support the object being conveyed. One such conveyor roller taught in U.S. Pat. No. 3,087,599 to Nelson. Nelson's conveyor roller employs two adjacent brush strips helically wound in abutting relationship about an arbor with the bristles of each brush strip tilted toward one another to thereby control bristle deflection. Such roller is thus formed with a relatively dense bristle pattern for conveying heavy flat materials.

U.S. Pat. No. 2,883,172 to Mitchell, teaches an apparatus for conveying sheet material, that is susceptible to marking or scratching. The apparatus, in one of its embodiments, includes rollers having fixed, helical brushes projecting therefrom.

Other cushioned type conveyor rollers are taught in U.S. Pat. No. 2,651,398 to McGraw, U.S. Pat. No. 3,543,582 to Kimmen, and to U.S. Pat. No. 2,703,165 to Couser.

The conveyor rollers of the prior art are generally not adapted to support large, heavy workpieces in a substantially horizontal plane where the workpiece includes portions which depend or project therefrom into conveyor rollers. Further, the prior art fails to teach brush conveyor rollers where brush strips, or portions of brush strips, are permitted to move axially along the mandrel to thereby allow easier lateral manipulation of a workpiece supported on two or more rollers to thereby position the workpiece for specific labor operations.

3. SUMMARY OF THE INVENTION

It is therefore an object of the present invention to provide a conveying support roller to support large, heavy workpieces in a substantially horizontal plane wherein such workpieces include portions which project therefrom into the conveying support roller.

It is a further object of the present invention to provide a conveying support brush roller wherein portions of the brush on one roller are capable of axial movement along the mandrel relative to other portions of the same brush.

Yet another object of the present invention is to provide a conveying support brush roller system wherein portions of the brush on one roller are permitted axial movement along the mandrel thereof relative to the brushes of other rollers of the system in response to the manipulation of a workpiece supported thereon.

Briefly stated, these and numerous other features, objects and advantages of the present invention will become readily apparent upon a reading of the detailed description, claims and drawings set forth herein. These objects, features and advantages are accomplished though a brush roller which includes a brush strip helically wound on a mandrel and anchored or attached to the mandrel only at the ends of the brush strip. The brush strip is wound on the mandrel such that adjacent coils of the backing channel are spaced apart from one another to form something akin to a coiled compression spring. The spacing between the backing channel of adjacent coils may be expressed in terms of this ratio on the number of coils per lineal inch of mandrel. Generally, this ratio will be in the range of from about ¼:1 to about 1½:1. Preferably, this ratio will be in this range of from about ½:1 to about 1:1 depending, of course, on the length and strength of the bristles when loaded in compression, the weight and dimensions of the object being supported, and the total brush surface actually in contact with and supporting the workpiece. To clarify interpretation of the above mentioned ration, if the mandrel is 30 inches long and has a ratio of ⅔:1, the number of coils around the mandrel will be 20 with a 30 inch mandrel and a ratio of 1½:1. This number of coils would be 45.

Because of gaps between the backing channel of adjacent coils, the fiber or bristle density of the brush across the entire surface of the roll is relatively low. This low fiber density allows portions of the workpiece which extend therefrom to infiltrate or penetrate into the roll between the fibers. Thus, the workpiece is maintained in substantially a horizontal plane even though the surface of the workpiece which contact the roller is irregular.

In addition, when a large workpiece is being manipulated for a labor operation, it is necessary not only that the user be able to move the workpiece in a direction perpendicular to the axis of the rollers, but further that the user be able to manipulate the workpiece perpendicular to the axis of the rollers. Two features of the present invention allow this type of lateral manipulation of the workpiece. First, the mandrel of the roller is supported on a axle whereby the bearings which support the mandrel on the axle allow for movement of the mandrel both rotationally about the axle and laterally along the axle. In addition, lateral manipulation of the workpiece in a direction parallel to the axis of the rollers is permitted by the coiled brushes. Because the backing channels are anchored to mandrel only at the ends thereof, and because them are gaps between the backing channel of adjacent coils, the coils are permitted to move axially along the mandrel relative to one another in response to the manipulation of the workpiece.

5. DETAILED DESCRIPTION OF THE PREFERRED EMBODIMENT

Figure 1:
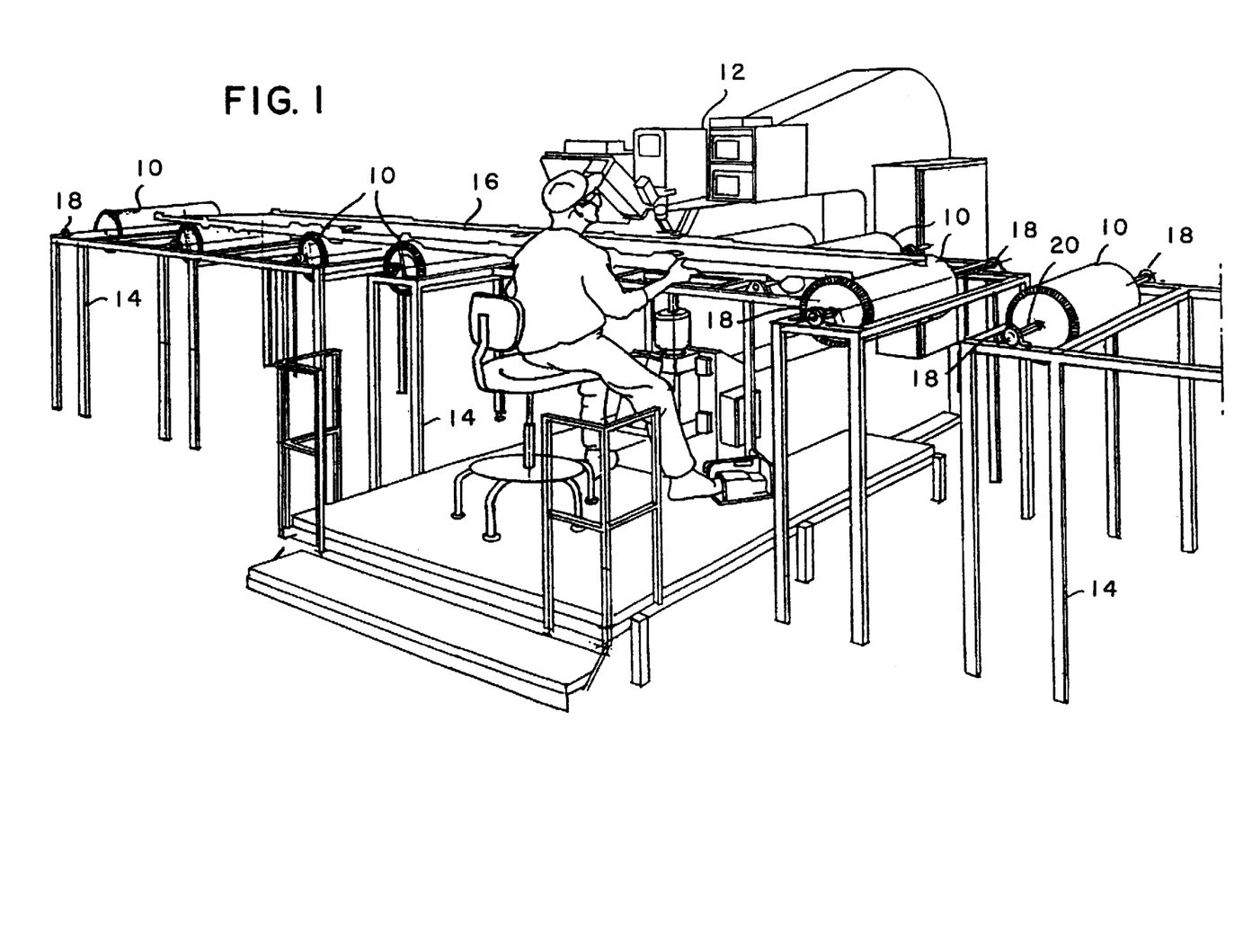
FIG. 1 is a perspective view of a conveying system employing a brush roll conveyor system of the present invention to allow for the support and manipulation of a workpiece in the operation of an automatic riveting machine.
Figure 2:
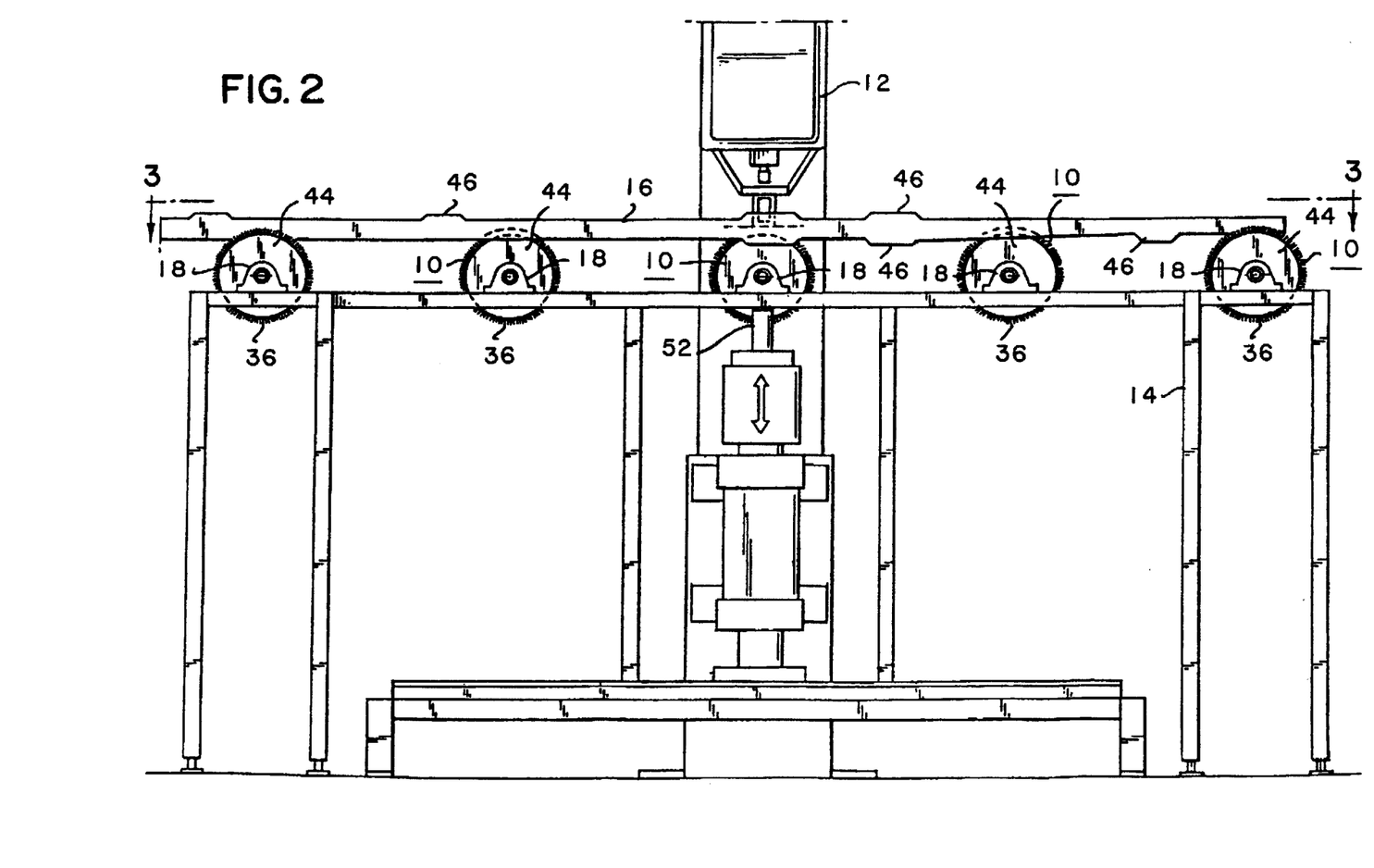
FIG. 2 is a front elevational view of the central portion of the brush roll conveying system shown in FIG. 1.
Figure 3:
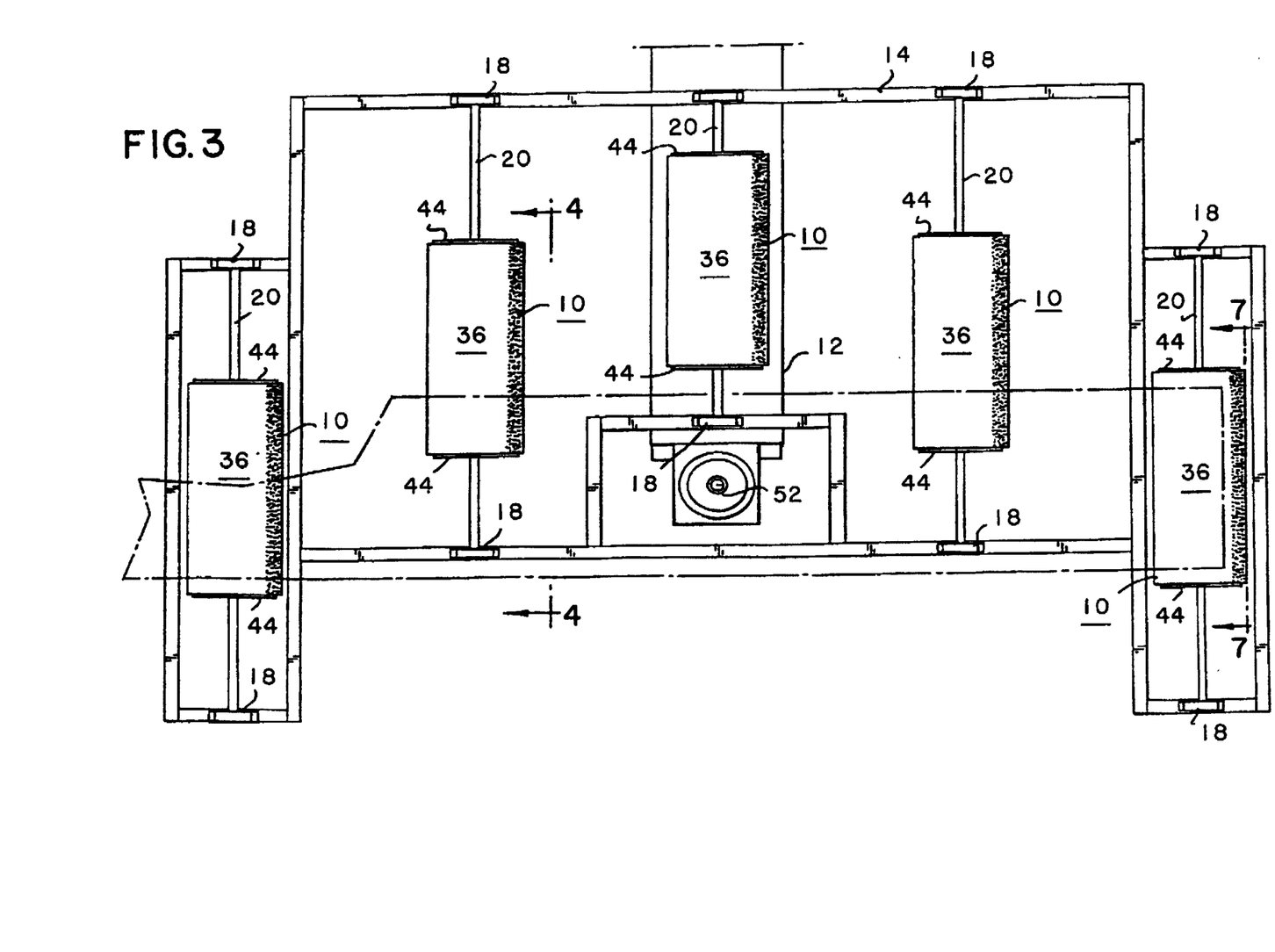
FIG. 3 is a top plan view of the central portion of the brush roll support system as depicted in FIG. 2.
Figure 7:
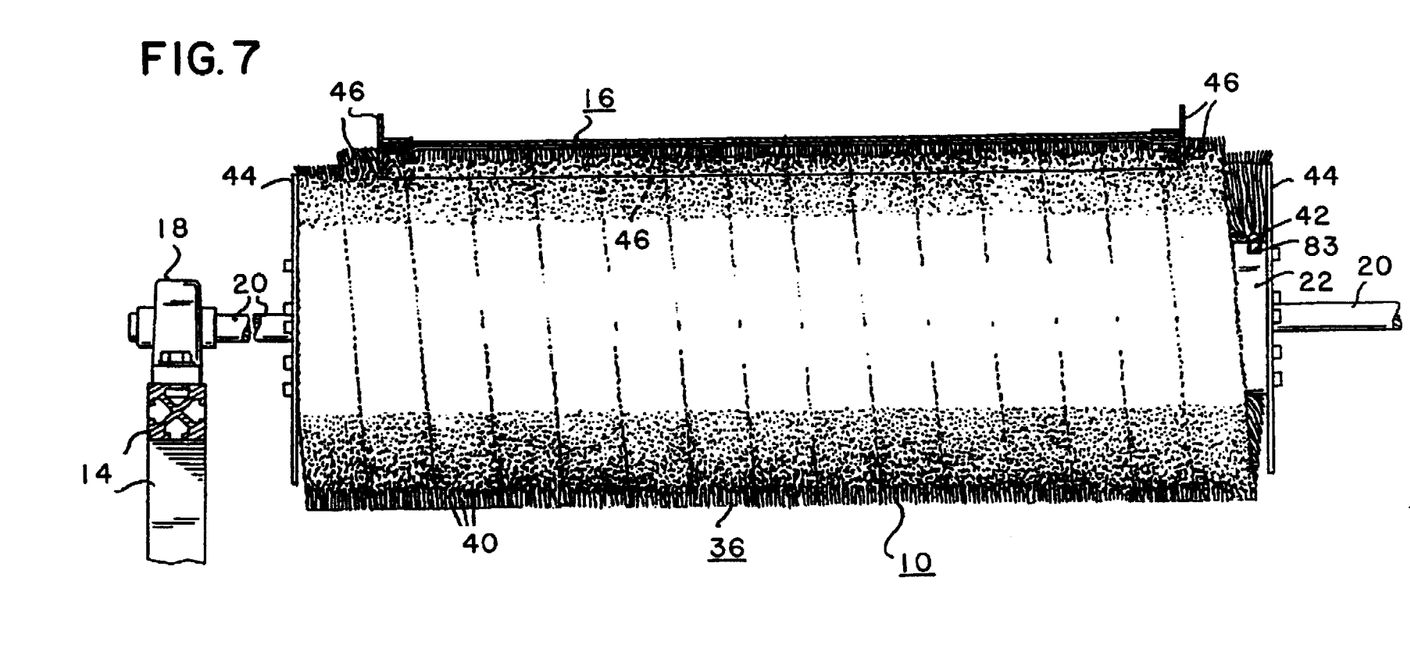
FIG. 7 is a side elevational view of an individual brush roll of the present invention having a workpiece supported thereon taken along line 7,7 of FIG. 3.

Turning first to FIG. 1 there is shown an perspective view of a plurality of conveyor rolls 10 are the present invention forming a conveyor system being used in conjunction with an automatic riveting machine 12. Each of the conveyor rolls 10 is supported on a frame 14. Frames 14 maybe designed to support individual or multiple conveyor rolls 10. The frames 14 are preferably anchored to the floor in fixed locations. The individual elements comprising frame 14 are preferably extruded aluminum or other suitable structural material for supporting the conveyor rolls 10 and a workpiece 16 being conveyed thereon. Making the individual structural elements of frame 14 from 40 mm by 40 mm extruded aluminum as obtained from Phoenix Mecano of Frederick Maryland has been found to be acceptable. Mounted to the top of frame 14 are a plurality of end bearings 18. Opposing pairs of end bearings 18 must be precisely aligned to support the axle 20 (see FIGS. 4 and 7). Each axle 20 is rotatably supported by opposing pairs of end bearings 18. Care should also be taken to ensure that following the end bearings 18 supported on frame 14 support the axles 20 such that the longitudinal axis of all of the axles 20 reside substantially in a single horizontal plane. End bearings 18 are preferably, high load, self-aligning slide bushings. Suitable high load self-aligning slide bushings can be obtained from NB Corporation of America located in Elk Grove Village, Ill.

Figure 4:
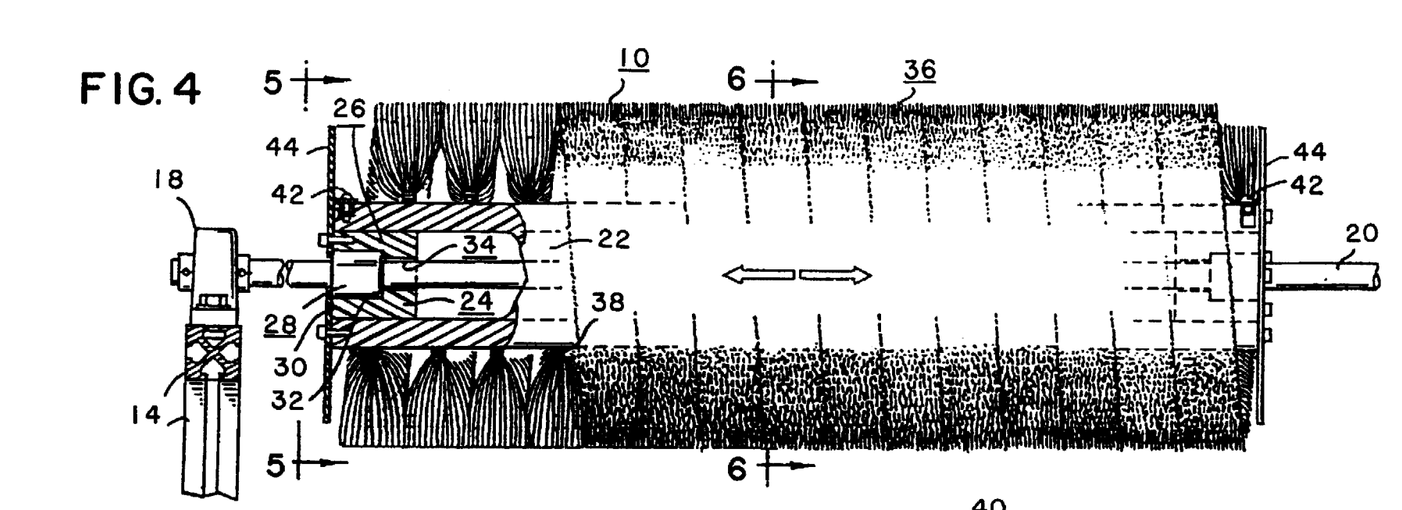
FIG. 4 is an enlarged partial sectional view of a brush support roll of the present invention taken along line 4,4 of FIG. 3.
Figure 5:
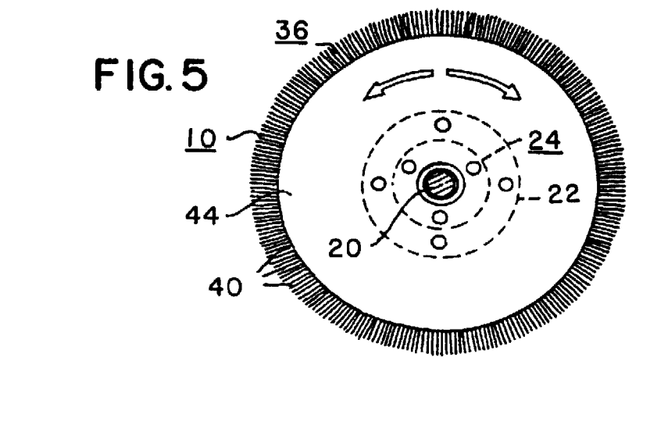
FIG. 5 is a sectional view taken along line 5,5 of FIG. 4.
Figure 6:
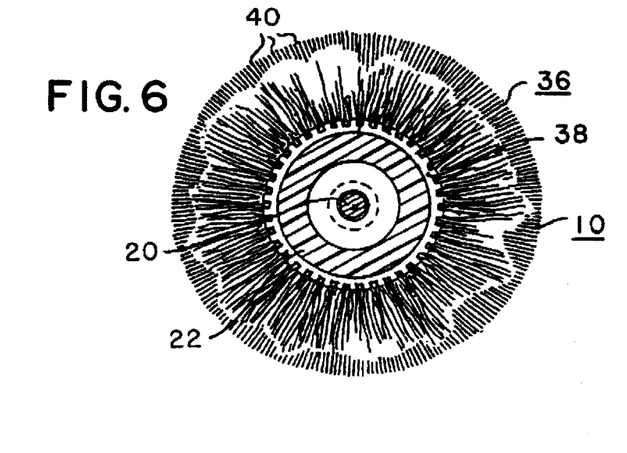
FIG. 6 is a sectional view taken along line 6,6 of FIG. 4.

The conveyor roll 10 includes a mandrel 22. Mandrel 22 is essentially a hollow cylinder having a hub 24 mounted to each end thereof. Each hub 24 includes a bearing housing 26 in the form of an annular opening in the outside face thereof. Bearing housing 26 extends only partially through hub 24 with the cylindrical axis of bearing housing 26 being concentric with the cylindrical axis of hub 24. Linear bearings 28 reside in bearing housings 26. Extending from the inside face 30 of the bearing housing 26 through the inside face 32 of hub 24 is cylindrical bore 34. Cylindrical bore 34 allows for the insertion of axle 20 through hubs 24. A cover plate is provided to retain linear bearings 28 in bearing housings 26. Linear bearings 28 allow for conveyor roll 10 to rotate about axle 20 and to move axially along the length of axle 20. Suitable linear bearings can be obtained from AMI Bearings, Inc. of Whelling, Ill. It has been found acceptable to manufacture mandrel 22 from PVC pipe having an outside diameter of 5 inches and an inside diameter of 3 inches.

Helically wound about the outside of mandrel 22 is brush 36. Brush 36 includes a backing channel or member 38 supporting and retaining bristles or fibers 40. Bristles or fibers 40 are preferably nylon and have a diameter in the range of 0.017 to 0.025 inches. The bristles 40 may either be straight or kinked, and preferably, extend a length of 3½ inches from the base of channel member 38. The length of the bristles 40 may be longer or shorter depending upon the projecting portions of the workpiece 16 which will penetrate between the bristles 40 while such rolls 10 while maintain the workpiece 16 in a substantially planar position. Other materials may be used for bristles 40 such as polypropelene or polyethylene. However, nylon appears to have a superior resistance to wear when used on the conveyor rolls 10 of the present invention.

The length of bristles 40 should be sufficient such that there will be a clearance between those portions of the workpiece 16 extending between the bristles and the backing channel member 38. Contact between any portion of workpiece 16 and backing channel member 38 may cause damage to the workpiece. A clearance of about ¼ inch from the top of backing channel member 38 to the most intrusive portion of workpiece 16 into the brush has been found to be acceptable.

Although helically wound about mandrel 22, channel member 38 is actually only attached to mandrel 28 at each terminal end of channel member 38 by means of a notch cut into the mandrel 28 proximate to each end of mandrel 28 with the terminal ends recessed in such notches and retained therein by screws 42. The brushes 36 are a commercially available item and can be obtained from Advance Brush of Cleveland, Ohio.

A bristle density per linear inch of channel member 38 of about 650 to 750 has been found to be adequate. The number of bristles is intended to mean the number of terminal ends of fibers extended to contact the workpiece 16. The spacing between adjacent coils of channel member 38 from centerline to centerline is preferably in the range of from about 1 to about 2 inches. For example, in supporting structural members to be used in the construction of aircraft wings, where a particular structural members weigh about 250 lbs and has a length of about 12 feet and a width of about 21 inches, a spacing of 2" from centerline to centerline of adjacent coils of channel member 38 has been found to be acceptable. This would yield a ratio as discussed above of ½:1. It should be noted that when brush 36 is first installed on mandrel 22, it appears that the fiber density will not be sufficient to adequately support a heavy workpiece 16. In fact, portions of the surface of mandrel 22 are visible through gaps created by the 4 inch pitch of the backing channel member 38. However, when a workpiece 16 is supported and conveyed across conveyor roll 10, the bristles 40 of adjacent coils deflect into one another and partially interleave. After a moderate amount of use, the bristles 40 remain in this interleaved position such that the mandrel 22 appears to be completely covered with a bristle surface as shown most clearly in FIG. 7.

Attached to each end of mandrel 22 is flange 44. Flange 44 is preferably sized such that it serves as the cover plate to retain linear bearings 28 in bearing housing 26. Flanges 44 further provide some lateral support for the bristles 40 of the end coils of backing channel member 38. Further, flanges 44 prevent the workpieces 16 having projections 46 extending between bristles 40 from sliding off of conveyor roll 10 during manipulation of workpiece 16 by the operator. The conveyor rolls 10 of the present invention are used to convey and support workpieces 16 during precision fabrication operations. For example, the workpiece 16 maybe an internal frame member to be used in the construction of a portion of an aircraft wing. Such a workpiece would include a main sheet member having various L-shaped or T-shaped members tacked thereto. Such T-shaped or L-shaped members typically span across the short dimension of the plate member and may further be located about the periphery of the plate member. Although the L-shaped or T-shaped members are already tacked to the plate member, each L-shaped or T-shaped member must be permanently attached thereto, typically using an automatic riveting machine 12. The tolerances for drilling of the holes and placement of the rivets are very precise. Manipulation of a large and heavy workpiece 16 to precisely position such workpiece 16 for drilling of the holes and placement of the rivets has been a relatively difficult procedure. Depending on the type of support table previously used, the operator of the automatic riving machine 12 may be required to physically support a portion of the workpiece 16 himself during the drilling and riveting operation. The conveyor rolls 10 of the present invention allow for a system wherein the workpieces 16 can be easily manipulated to precisely place the workpiece 16 in each position for the drilling of a hole and the insertion of a rivet. In addition, the nylon brushes 16 ensure that the workpiece 16 will be conveyed without any damage thereto.

When an operator is positioning a workpiece 16 to perform a particular labor operations, such as in the operation of an automatic riveting machine, the workpiece 16 is pulled across the plurality of conveyor rolls 10 forming the conveyor system. The conveyor rolls 10 rotate freely thereby allowing such movement of workpiece 16 to be easily accomplished by the operator. In the performance of the precision labor operations, it is necessary to position the workpiece 16 such that a specific point is located on the workpiece 16. This requires that the workpiece 16 be moveable across the conveyor rolls 10 not only in a direction perpendicular to the axes of the conveyor rolls 10, but also that the workpiece 16 be moveable in a direction parallel to the axes of the conveyor rolls 10. This is accomplished through the linear bearings 28 which allow conveyor rolls 10 to travel laterally along axles 20.

Figure 10:
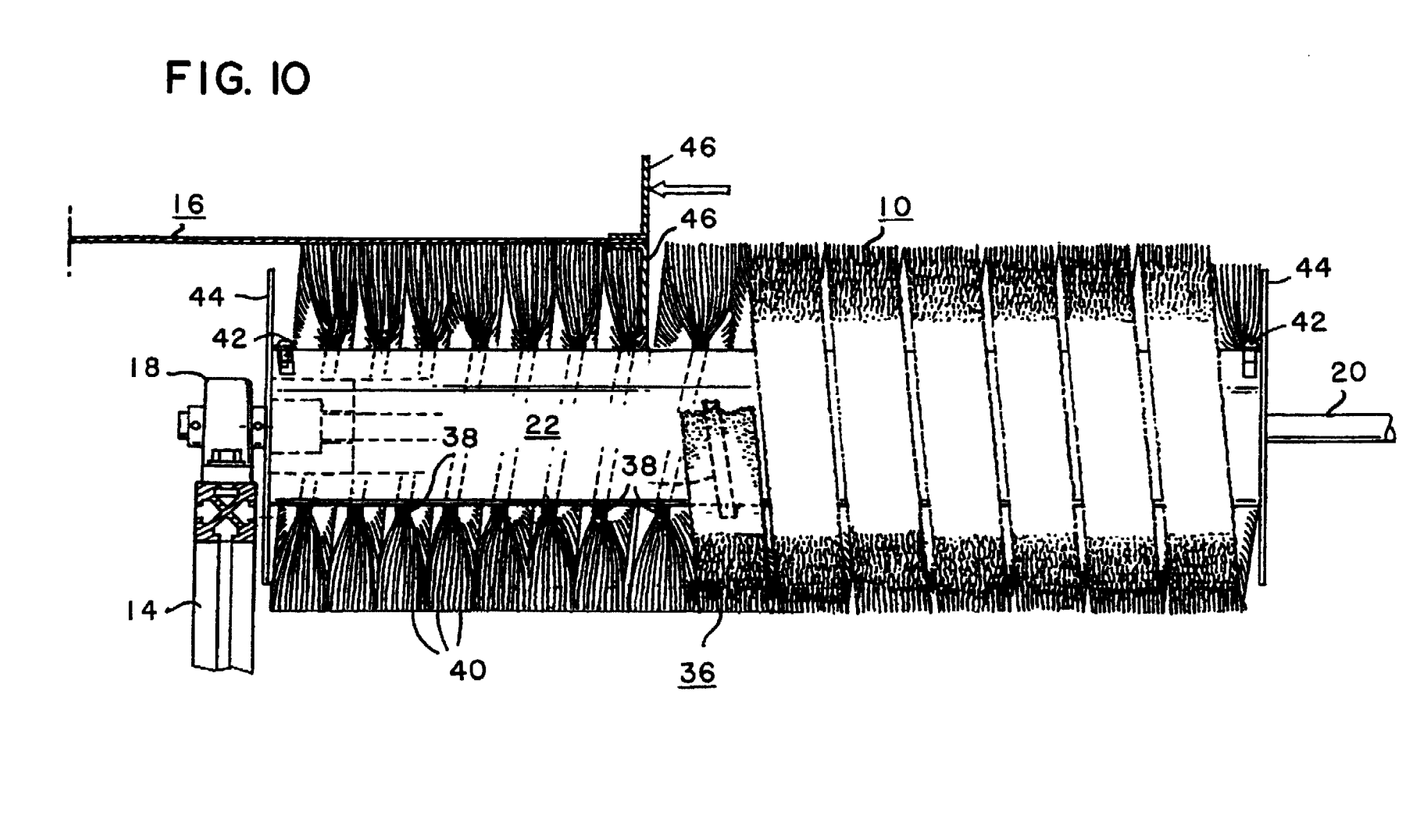
FIG. 10 is a sectional view similar to FIG. 4 showing relative movement of adjacent coils of the brush in response to movement of the workpiece.

It should be appreciated by those skilled in the art that because workpieces 16 may be irregularly shaped and because conveyor rolls 10 may not always be located at similar positions along their respective axles 20, it is possible that when the operator is moving the workpiece 16 parallel to the axes of conveyor rolls 10, that one conveyor roll 10 may reach its travel stop before other conveyor rolls 10 within the system reach their respective travel stops. The travel stop of each conveyor rolls 10 occurs when the plate retaining linear bearing 28 in bearing housing 26 contacts in end bearing 18. If the brush 36 was affixed to mandrel 22 across its entire length, then further movement would be prevented by such travel stop. However, because backing channel member 38 is affixed to mandrel 22 only at the ends thereof, backing channel member 38 forms a coil spring like structure wherein adjacent coils are permitted to move relative to one another. In such manner, particularly with projections 46 of the workpiece 16 extending down between the bristles 40 of brush 36, the workpiece 16 can still be manipulated by the operator in a direction parallel to the axes of the conveyor roll 10 even when a particular conveyor roll 10 has reached its travel stop. As the operator continues to exert force on the workpiece 16, the pitch of the coils of channel member 38 will be varied such that some adjacent coils will now be closer together and other adjacent coils will now be further apart. The operator has thus compressed that portion of backing channel member 38 between the portion of the workpiece 16 which projects into the brush surface. This deformation of backing channel member 38 through manipulation of a workpiece 16 is temporary. When the workpiece 16 is removed from the conveyor roll 10, the coils of channel member 38 will return substantially to their original pitch.

Figure 8:
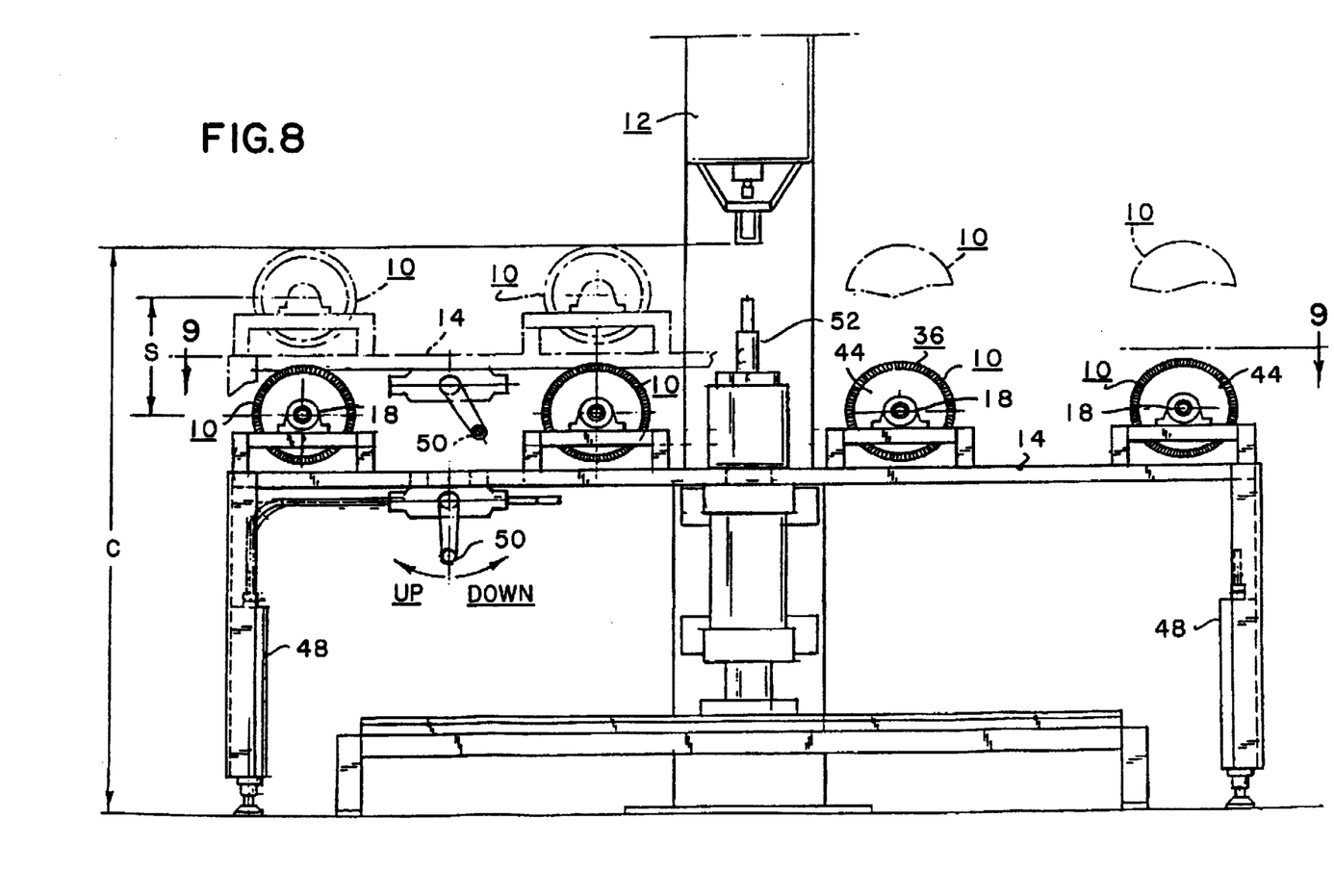
FIG. 8 is a front elevational view of an alternative embodiment similar to that show in FIG. 2 but including a hand operated hydraulic system for raising and lowering the support brush rolls of the present invention.
Figure 9:
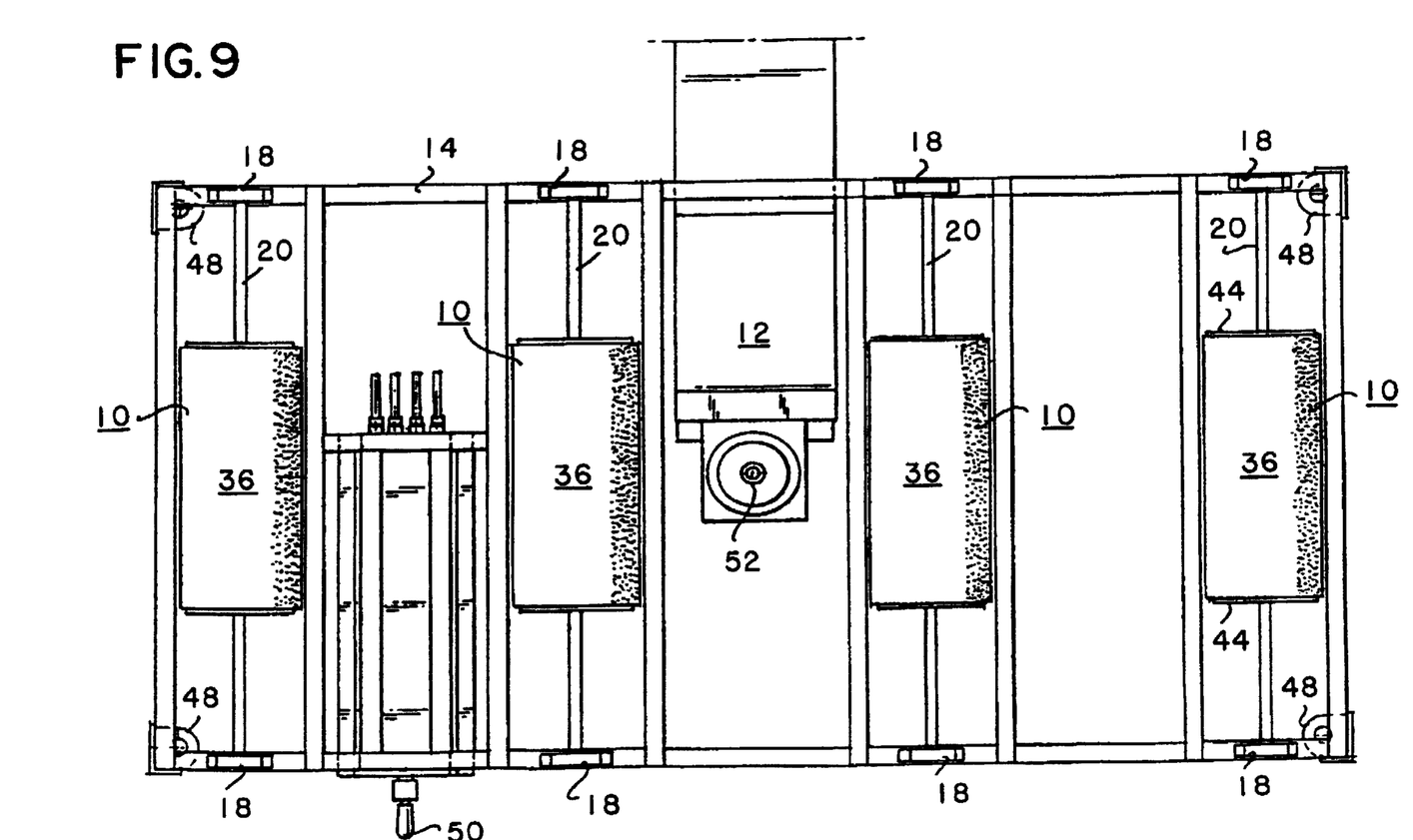
FIG. 9 is a top plan view of the alternative embodiment depicted in FIG. 8.

Looking next at FIGS. 8 and 9, there is shown an alternative embodiment of the present invention which is identical in operation to the embodiment depicted in FIGS. 1 through 7 in all respects with the exception that the central portion of the conveyor roll system includes a hydraulic lift system. The hydraulic lift system will generally require some modifications to the frame 14 such that, preferably, there are four main support members or legs, each having a hydraulic piston/cylinder arrangement 48. A control lever 50 is provided so that the operator can simultaneously operate all four hydraulic piston/cylinders 48 to thereby raise the upper portion of frame 14 such that any workpiece supported on conveyor rolls 10 can be raised or lowered to the desired height for the performance of a particular labor step.

In the operation of an automatic riveting machine 12, such machine will often include a magnified optical site showing on a video monitor the top and bottom views of the workpiece so that the operator can precisely place the workpiece 16 to locate a particular point of the workpiece 16. The operator can then drill a hole or insert a rivet in the hole at that particular point in the operation of the automatic riveting machine 12. Either for the drilling of a hole or the placement of a rivet, a support and clamping member 52 rises to meet the bottom surface of the workpiece 16 so that the labor step of drilling a hole through the workpiece or the insertion of a rivet into the hole will not cause the workpiece 16 to move.

From the foregoing, it will been seen that this invention is one well adapted to attain all of the ends and objects hereinabove set forth together with other objects which are apparent and which are inherent to the apparatus.

It will be further understood that certain features and subcombinations are of utility and maybe employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A support roller for a workpiece support and conveying system comprising:

(a) an axle;

(b) a mandrel supported on said axle by linear bearings, said mandrel capable of rotational movement about said axle and lateral movement along said axle;

(c) brush means mounted on said mandrel, portions of said brush means being movable laterally along said mandrel.

2. A support roller for a workpiece support and conveying system as recited in claim 1 wherein:

said brush means includes a channel backing member with a plurality of fibers extending therefrom, said channel backing member helically wound about said mandrel, said channel backing member thereby forming a plurality of spaced apart coils.

3. A support roller for a workpiece support and conveying system as recited in claim 2 wherein:

said channel backing member includes a pair of terminal ends, said channel backing member being affixed to said mandrel proximate to said terminal ends.

4. A support roller for a workpiece support and conveying system as recited in claim 2 wherein:

said plurality of spaced apart coils are formed at a predetermined pitch, said predetermined pitch being variable in response to the shape and movement of the workpiece supported thereon.

5. A support roller for a workpiece support and conveying system as recited in claim 2 wherein:

said brush means has a fiber density sufficient to generally support the workpiece in a working plane while simultaneously allowing portions of the workpiece extending angularly from a bottom surface of said workpiece to infiltrate between said fibers.

6. A support roller for a workpiece support and conveying system as recited in claim 1 wherein:

said brush means has a fiber density sufficient to generally support the workpiece in a working plane while simultaneously allowing portions of the workpiece extending angularly from a bottom surface of said workpiece to infiltrate between said fibers.

7. A support roller for a workpiece support and conveying system comprising:

(a) an axle;
(b) a mandrel supported on said axle by linear bearings, said mandrel capable of rotational movement and lateral movement relative to said axle;
(c) brush means coiled about said mandrel in a predetermined pitch, said pitch being variable in response to the shape and movement of the workpiece supported thereon.

8. A support roller for a workpiece support and conveying system as recited in claim 7 wherein:

said brush means has a fiber density sufficient to generally support the workpiece in a working plane while simultaneously allowing portions of the workpieceof the workpiece extending angularly of the extending angularly from a bottom surface of said workpiece to infiltrate between said fibers.

9. A workpiece support and conveying system comprising:

at least two support rollers defining a working plane in which a bottom surface of a workpiece substantially resides, each of said support rollers including
(a) an axle;
(b) a mandrel supported on said axle by linear bearings, said mandrel capable of rotational movement and lateral movement relative to said axle;
(c) a brush including a plurality of fibers, said brush attached to said mandrel, said brush having a fiber density sufficient to generally support the workpiece in said working plane while simultaneously allowing portions of the workpiece extending angularly from said bottom surface to infiltrate between said fibers.

10. A workpiece support and conveying system as recited in claim 9 further comprising:

a frame supporting said at least two support rollers at substantially the same elevation.

11. A workpiece support and conveying system as recited in claim 10 further comprising:

hydraulic lift means affixed to said frame for raising and lowering said at least two support rollers while simultaneously maintaining said at least two support rollers at substantially the same elevation.

12. A workpiece support and conveying system as recited in claim 9 wherein:

said brush includes a channel backing member with said plurality of fibers extending therefrom, said channel backing member helically wound about said mandrel, said channel backing member thereby forming a plurality of spaced apart coils.

13. A workpiece support and conveying system as recited in claim 12 wherein:

said channel backing member includes a pair of terminal ends, said channel backing member being affixed to said mandrel proximate to said terminal ends.

14. A workpiece support and conveying system as recited in claim 12 wherein:

said plurality of spaced apart coils are formed at a predetermined pitch, said predetermined pitch being variable in response to the shape and movement of the workpiece supported thereon.

15. A workpiece support and conveying system comprising:

at least two support rollers defining a working plane having a predetermined variable transverse dimension or width, each of said support rollers comprising;
(a) an axle;
(b) a mandrel rotatably supported on said axle and adapted for axial movement along said axis;
(c) a brush assembly comprising a plurality of fibers attached to the mandrel having a fiber density sufficient to generally support the workpiece in the working plane while allowing portions of the workpiece extending angularly to infiltrate the fibers;
(d) the axial length of each said brush assemblies being of a predetermined length so that when two support rollers assemblies are in a side by side relationship, the transverse width of the working plane may be expanded to a dimension greater than the predetermined length of each brush assembly when the assemblies are moved in opposite directions on their respective axles.

16. A support roller for a workpiece support and conveying system as recited in claim 15 wherein:

said brush means includes a channel backing member with a plurality of fibers extending therefrom, said channel backing member helically wound about said mandrel, said channel backing member thereby forming a plurality of spaced apart coils.

17. A support roller for a workpiece support and conveying system as recited in claim 16 wherein:

said channel backing member includes a pair of terminal ends, said channel backing member being affixed to said mandrel proximate to said terminal ends.

18. A support roller for a workpiece support and conveying system as recited in claim 16 wherein:

said plurality of spaced apart coils are formed at a predetermined pitch, said predetermined pitch being variable in response to the shape and movement of the workpiece supported thereon.

19. A support roller for a workpiece support and conveying system as recited in claim 16 wherein:

said brush means has a fiber density sufficient to generally support the workpiece in a working plane while simultaneously allowing portions of the workpiece extending angularly from a bottom surface of said workpiece to infiltrate between said fibers.

20. A support roller for a workpiece support and conveying system as recited in claim 15 wherein:

said brush means has a fiber density sufficient to generally support the workpiece in a working plane while simultaneously allowing portions of the workpiece extending angularly from a bottom surface of said workpiece to infiltrate between said fibers.

21. A workpiece support and conveying system comprising:

at least two support rollers, each of said support rollers comprising;
(a) an axle;
(b) a mandrel rotatably supported on said axle and adapted for axial movement along said axis;
(c) a brush assembly having a predetermined axial length and comprising a plurality of fibers attached to the mandrel having a fiber density sufficient to generally support the workpiece in the working plane while allowing portions of the workpiece, extending angularly to infiltrate the fibers;

(d) a plane tangent to the periphery of two adjacent brush assemblies defining a horizontal working plane generally parallel to the axis of rotation of the brush assemblies, the transverse width of the working plane expandable to a dimension greater than the axial length of each of the brush assemblies by moving the brush assemblies of adjacent assemblies axially on the axle in opposite directions.

22. A support roller for a workpiece support and conveying system as recited in claim 21 wherein:

said brush means has a fiber density sufficient to generally support the workpiece in a working plane while simultaneously allowing portions of the workpiece extending angularly from a bottom surface of said workpiece to infiltrate between said fibers.

23. A workpiece support and conveying system as recited in claim 21 further comprising:

a frame supporting said at least two support rollers at substantially the same elevation.

24. A workpiece support and conveying system as recited in claim 23 further comprising:

hydraulic lift means affixed to said frame for raising and lowering said at least two support rollers while simultaneously maintaining said at least two support rollers at substantially the same elevation.

25. A workpiece support and conveying system as recited in claim 21 wherein:

said brush includes a channel backing member with said plurality of fibers extending therefrom, said channel backing member helically wound about said mandrel, said channel backing member thereby forming a plurality of spaced apart coils.

26. A workpiece support and conveying system as recited in claim 25 wherein:

said channel backing member includes a pair of terminal ends, said channel backing member being affixed to said mandrel proximate to said terminal ends.

27. A workpiece support and conveying system as recited in claim 25 wherein:

said plurality of spaced apart coils are formed at a predetermined pitch, said predetermined pitch being variable in response to the shape and movement of the workpiece supported thereon.

* * * * *